March 5, 1968   J. C. GUYESKA   3,372,323
INDUCTION MOTOR SLIP FREQUENCY CONTROL SYSTEM
Filed March 31, 1965   4 Sheets-Sheet 1

INVENTOR.
JOHN C. GUYESKA
BY Woodling, Krost,
Granger and Rust
ATTORNEYS

INVENTOR.
JOHN C. GUYESKA
BY Woodling, Krost, Granger and Rust
ATTORNEYS

March 5, 1968  J. C. GUYESKA  3,372,323
INDUCTION MOTOR SLIP FREQUENCY CONTROL SYSTEM
Filed March 31, 1965  4 Sheets-Sheet 3

INVENTOR.
JOHN C. GUYESKA
BY Woodling, Krost,
Granger and Rust
ATTORNEYS

FIG. 8

INVENTOR.
BY JOHN C GUYESKA
ATTORNEYS

United States Patent Office 3,372,323
Patented Mar. 5, 1968

3,372,323
INDUCTION MOTOR SLIP FREQUENCY
CONTROL SYSTEM
John C. Guyeska, Newbury, Ohio, assignor to Reliance Electric and Engineering Company, a corporation of Ohio
Filed Mar. 31, 1965, Ser. No. 444,193
19 Claims. (Cl. 318—230)

ABSTRACT OF THE DISCLOSURE

The invention relates to frequency changers supplying an alternating voltage to an induction motor at a variable frequency to control the speed of the motor. The slip of the motor is maintained at a fixed or predetermined maximum value regardless of speed change or load change in the motor. This fixed or determined slip is established by a slip reference voltage with the magnitude of the voltage determining the amount of the slip of the motor. A tachometer generator supplies a signal proportional to motor speed with this tachometer generator algebraically combined with a speed reference voltage and the difference being an error signal to control the voltage output of the frequency changer. Additionally the tachometer voltage is combined with a slip reference voltage and the algebraic sum is used to control the frequency of the output of the frequency changer.

---

This invention relates to dynamo electric machines and, more particularly, to an induction motor slip frequency control system.

Numerous attempts have been made to provide apparatus for controlling the speed of an induction motor. The objects to be achieved by the successful realization of this objective include low initial motor cost per horsepower, low maintenance expense, greater motor reliability and optimum performance of the machine by reducing the requirements of the machine to operate over a wide range of slip frequencies.

Accordingly, it is an object of this invention to provide a control system for an induction motor which permits the slip frequency of the rotor to be regulated and closely controlled.

It is another object of this invention to provide an induction motor control system which controls the operation of the induction motor such that it operates with a fixed slip frequency.

Yet another object of this invention is to provide a control system for an induction motor which prevents the slip frequency from exceeding a predetermined value.

Briefly, in accordance with aspects of this invention, I have discovered a static induction motor control system for closely controlling the slip frequency by employing a combination of static apparatus for comparing the rotor speed with a reference voltage to derive a resultant voltage; employing this resultant as a voltage control input to a static frequency changer, which frequency changer supplies power to the stator of the induction motor; comparing a voltage signal proportional to speed with a voltage signal proportional to slip in a static network; and employing the resultant of this latter comparison to control the frequency of a static voltage-to-frequency converter, which frequency is proportional to the input voltage and to employ the output of the converter as a second input to the frequency changer. This second input to the frequency changer controls the frequency of the stator voltage of the induction motor. Advantageously, this system is capable of controlling the operation of the induction motor at a fixed slip frequency.

In accordance with other aspects of this invention, an induction motor control system is operated to control the motor at a fixed slip frequency by applying an electrical polyphase voltage to the stator of the machine which frequency is determined by adding the mechanical shaft speed (or frequency), $w_m$ to a constant speed (or frequency), $w_s$. The result of the summation is that the rotating magnetic field in the machine is always rotating at a speed different from the shaft speed by the amount of slip speed which is independently set. If $w_e$ represents the rotational speed of the magnetic field, the condition existing in the system is represented by the equation:

$$w_e = w_m + w_s$$

If it is desired to hold a constant output speed for the motor under varying conditions, such as varying load, the applied voltage of the induction motor stator is varied. In one illustrative embodiment, a tachometer is coupled to the motor shaft to give a voltage proportional to the shaft speed. This tachometer provides an output voltage which is compared in an operational amplifier with a reference voltage corresponding to the desired speed and the algebraic difference of these two voltages is an error signal delivered at the amplifier output and which is employed to control the output voltage of a frequency changer. This error signal affects only the output voltage magnitude of the frequency changer. The tachometer voltage is also combined in a second operational amplifier with a slip reference voltage corresponding to the slip speed and this resultant voltage is used to determine the output frequency of the frequency changer. Advantageously, the operational amplifiers operate at a low power level, and the frequency changer operates at a high power level, handling the power requirements of the induction motor and its associated load.

In accordance with other aspects of this invention, I provide a system for limiting the slip frequency of an induction motor in which this objective is accomplished by limiting the frequency of the applied polyphase stator voltage such that the stator frequency (or speed) never deviates from the output speed of the shaft (or frequency) by more than the predetermined slip speed (or frequency). Because this system is capable of four-quadrant operation of the speed-torque curve, i.e., operation as either a motor or a generator, the relationship between the three speeds is represented by the formula:

$$w_m \pm w_s = w_e$$

where the shaft speed is $w_m$, the slip speed is $w_s$ and the stator frequency is $w_e$. The polarity sign of $w_s$ is determined by the speed-torque quadrant in which the motor is operating, the sign is positive in the first and third quadrants and negative in the second and fourth (induction generator) quadrants.

In accordance with still other aspects of this invention, a tachometer is coupled to the shaft of the induction motor and delivers an output proportional to the induction motor rotor speed. The tachometer voltage or output signal is compared in a first operational amplifier combining circuit to a reference voltage and the resulting error signal is fed through an absolute valve circuit, which may be an operational amplifier, to control the output voltage of a frequency changer through which primary power is supplied to the motor stator. The absolute value of this error signal is employed to control the output voltage of a frequency changer, the output of which is coupled to the induction motor stator.

This system also includes a second operational amplifier combining circuit for algebraically combining the signal from the tachometer, which is a voltage proportional to speed, with a signal voltage proportional to the slip of the induction rotor. The resultant signal voltage of this combination is fed to the frequency control input of the frequency changer. Because the signal voltage, which is proportional to slip, is fed to the combining circuit through a limiter, the maximum magnitude of slip speed is controlled by the voltage at which the limiter action starts. Thus, although the magnitude of the voltage proportional to the slip speed is limited, its polarity may change if the error voltage changes. If the error becomes negative, this indicates that the motor is operating in the induction generator quadrant. The output signal of the second operational amplifier controls the output frequency of the frequency changer. The output of the frequency changer is connected to the stator of the induction motor and thus controls the stator frequency.

These and various other objects and features of the invention will be more clearly understood from a reading of the detailed description of the invention in conjunction with the drawing in which.

Figure 1:
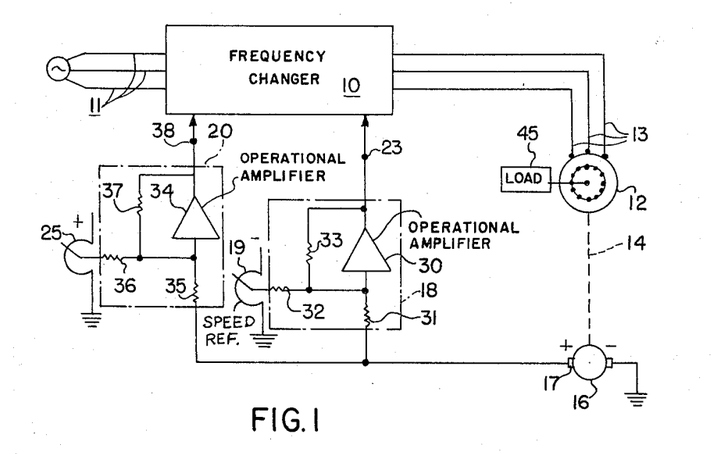
FIGURE 1 is a combined block and schematic diagram of one illustrative embodiment of induction motor slip frequency control system for one quadrant operation.

Referring now to FIGURE 1, there is shown in combined block and schematic diagram form an induction motor slip frequency control system in which the system is a one-quadrant system capable of controlling the slip frequency at a fixed value. This embodiment includes a frequency changer 10 to which a source of prime input power is connected by means of the phase lines 11. Advantageously, the frequency changer may be of any convenient type which receives primary power and converts its frequency and voltage in accordance with signals received at a frequency control input and a voltage control input, respectively. The frequency changer 10 is connected to the stator windings of an induction motor 12, as indicated by the three-phase lines 13, to deliver power thereto controlled as to voltage and frequency. Preferably, but not necessarily, the induction motor 12 is of the squirrel cage type. The induction motor has an output shaft 14 which is connected in driving relationship to a suitable load 45 and also to a tachometer generator 16. The tachometer generator will deliver an output signal proportional to the speed of rotation of the output shaft 14 and this output signal is fed from a tachometer output terminal 17. The terminal 17 is connected to one of the inputs of a static algebraic combining circuit 18 which will be subsequently described in detail, which also receives a speed reference direct current input signal from a speed reference potentiometer 19. This reference signal may be manually adjusted and its magnitude determines the reference speed at which the induction motor is to be run. The circuit 18 algebraically combines the speed feedback signal from terminal 17 and speed reference signal from potentiometer 19. Terminal 17 is also connected to a second static algebraic combining circuit 20, which will also be subsequently described in detail, such that the circuit 20 also receives an input voltage proportional to the speed of the tachometer generator 16.

Figure 2:
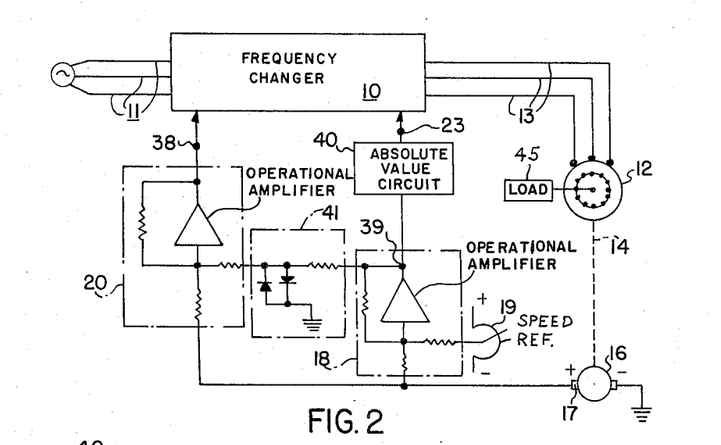
FIGURE 2 is a combined block and schematic diagram of an induction motor slip frequency control system for four-quadrant operation.

The algebraic resultant signal between the comparison of the voltage proportional to speed supplied from the terminal 17 and the voltage reference level applied from the potentiometer 19 is fed from the combining circuit 18 to a voltage controlling input terminal 23 of the frequency changer 10. The magnitude of error signal is indicative of the magnitude of the difference between the potential of the reference voltage potentiometer 19 and the speed responsive signal from terminal 17. This error signal controls the output voltage of the frequency changer 10, which, in turn controls the voltage applied through the line 13 to the stator of the induction motor 12. In FIGURES 1 and 2, the adjustment which sets the speed of the motor is the potentiometer 19 labeled "speed reference."

A second static algebraic combining circuit 20 also receives a speed indicating signal from brush 17. A slip reference direct current voltage is fed to the combining network 20 from a slip reference potentiometer 25 which is a voltage proportional to a predetermined permissible slip of the induction motor 12. The slip reference potentiometer 25 in FIGURE 1 is not normally adjusted during operation. Potentiometer 25 is preferably adjusted for optimum motor operation with respect to the motor speed-torque curve, e.g., in the order of one percent slip of normal 60 cycle operation with operation at the 60 cycle point. Alternatively, it may be in the order of one cycle at all frequencies. The output of the combining circuit 20 is a frequency controlling signal proportional to the combination of the slip reference voltage from potentiometer 25 and the signal voltage proportional to speed from terminal 17 and this output is applied as a frequency controlling signal to frequency changer 10. The frequency of the output power from the frequency changer 10 as fed over the line 13 to the induction motor 12 is therefore controlled by the frequency of the signal supplied from the second algebraic combining circuit 20 and the output voltage of frequency changer 10 is controlled by the error signal from the first algebraic combining circuit 18.

The static algebraic combing circuits 18, 20 may be of any convenient type well known in the art. For example, these circuits may be of the operational amplifier type disclosed in Industrial Electronics Handbook by William D. Cockrell, First edition, 1958, pages 6–123 through 6–125. In fact, both combining circuits 18 and 20 are patterned after the operational amplifier for producing addition shown schematically on page 6–124 as the second example in the right-hand column. The operational amplifier algebraic combining circuit 18 includes a direct current amplifier 30, a first input resistor 31, a second input resistor 32, and a shunt resistor 33. The resistor 31 is serially connected between the terminal 17 and the input to the direct current amplifier 30 while the resistor 32 is connected between the direct current speed reference potentiometer 19 and the input to the direct current amplifier 30. In the schematic example shown in the above-mentioned text, three input resistors are employed, however, this specific operational amplifier 18 employs only two. This, however, is the only distinction between the configuration and operation of the amplifiers and their associated networks. Similarly, the static combining circuit 20 is an operation amplifier employing a direct current amplifier 34 with a first input resistor 35 connected between the terminal 17 and the input to the direct current amplifier 34. A second input resistor 36 is connected between the slip reference potentiometer 25 and the input to the direct current amplifier 34 and a shunt resistor 37 is connected in shunt with the direct current amplifier 34. Although this specific embodiment is shown employing operational amplifiers, it is, of course, understood that other combining circuits could be employed to produce the algebraic combining function of these circuits.

This system is suitable for controlling the speed of the induction motor 12 and is particularly adapted to controlling the induction motor at a fixed slip frequency. It is well known that for a given slip, the torque of an induction motor is proportional to the square of the stator voltage. This proportionality also exists between the torque of the induction motor and the error signal from the first algebraic combining circuit 18. It is also understood that the rotor speed of an induction motor is approximately proportional to the stator frequency for a given percentage slip. Thus, if the slip is determined by means of the control system, the rotor speed of the motor 12 will be proportional to the stator frequency, which frequency is determined by the frequency control signal from the second algebraic combining circuit 20 to a frequency controlling input terminal 38 of frequency changer 10. Stated in another manner, the rotor speed $$N_2 = \frac{120}{P}(f-s)$$

where $N_2$ is rotor speed in r.p.m.,
$f$ is stator frequency in cycles per second,
P is number of poles of the induction motor, and
$s$ is slip expressed in cycles per second.

The percentage slip will change as $f$ changes.

FIGURE 2 is an alternative embodiment of induction motor slip frequency control system in which the system is particularly adapted to limit the slip frequency to a predetermined maximum value, regardless of polarity. In this embodiment, power is also fed to the frequency changer 10 through the group of power lines 11 and the frequency changer 10 delivers an output over the group of lines 13 to the stator of an induction motor 12. Also, induction motor 12 has an output shaft 14 to which a suitable load 45 may be connected and the output shaft is also connected in driving relationship to the tachometer generator 16. The tachometer generator 16 delivers an output voltage proportional to speed from its terminal 17. The terminal 17 is connected to one of the inputs of the first static algebraic signal-combining circuit 18. A variable potentiometer 19 is also connected to the signal combining circuit 18 and supplies a variable direct current speed reference potential, which acts as a rotor speed reference input signal for the control system. The output of the first combining circuit 18 is delivered to a terminal 39, which terminal is connected to the input of an absolute value determining circuit 40, which will be subsequently shown and described in detail. In other words, the circuit 40 is of the type which delivers an output voltage proportional to the magnitude and independent of the polarity of the input signal applied to the terminal 39. The output of circuit 40 is fed to the input terminal 23 of the frequency changer 10. The signal applied to terminal 23 constitutes the output voltage controlling input signal to the frequency changer 10. The output of combining circuit 18 applied to the terminal 39 is also transmitted through a limiter circuit 41 to one input of the second static signal-combining circuit 20. This signal will be a voltage proportional to the slip of the induction motor 12. A signal which is a voltage signal proportional to speed is also fed from the terminal 17 to a second input of the second combining circuit 20. The output of the second combining circuit 20 is fed to the frequency controlling input terminal 38 of the frequency changer 10.

The limiter circuit 41 includes reversely connected diodes to limit the amplitude of the voltage, in both polarities, applied as the slip reference voltage input to the combining circuit 20. Accordingly the slip is controlled in magnitude to a predetermined maximum, determined by the forward voltage drop across these diodes.

Figure 3:
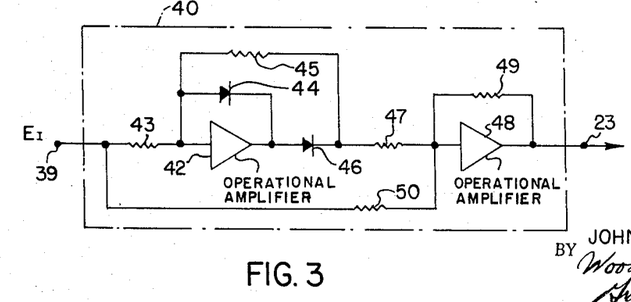
FIGURE 3 is a combined schematic and block diagram of an illustrative absolute value circuit which may be employed in the four-quadrant system shown in FIGURE 2.

One illustrative embodiment of absolute value circuit 40 is shown in FIGURE 3. As therein depicted, two operational amplifiers are serially connected between the input terminal 39 and the terminal 23. The first operational amplifier includes a direct current amplifier 42 connected by means of a resistor 43 to the input terminal 39. A rectifier 44 is connected in parallel with the direct current amplifier 42 and a resistor 45 is connected between the input of the amplifier 42 and the output of a rectifier 46, which rectifier has its input terminal connected to the output terminal of rectifier 44 and the output terminal of direct current amplifier 42. The second operational amplifier includes a direct current amplifier 48 having its input terminal connected by means of a resistor 47 to the output terminals of rectifier 46 and resistor 45. A resistor 49 is connected in parallel with the direct current amplifier 48 and another resistor 50 is connected between the input terminal of the direct current amplifier 48 and the input terminal 39. The absolute value circuit 40 provides an output potential at terminal 23 which is proportional to the absolute value of the input potential applied to terminal 39 in a manner well known in the art. Because of the peculiar configuration of this control system and particularly because the circuit 40 responds only to the magnitude and is independent of polarity of the error signal, this induction motor slip frequency control system is particularly adapted to control the speed of induction motor 12 all in quadrants of operation with respect to the speed-torque curve.

Figure 4:
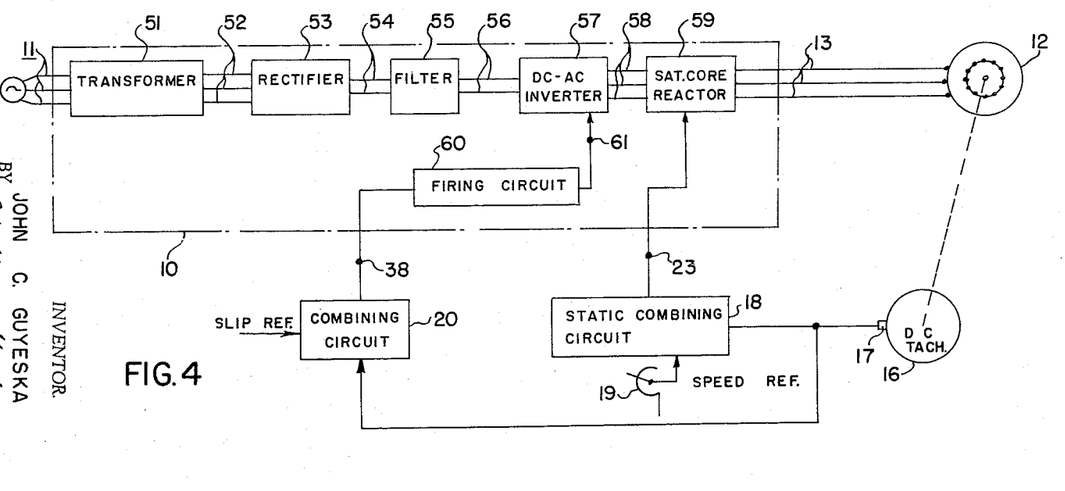
FIGURE 4 is a block diagram of one illustrative frequency changer which may be employed in the embodiments of FIGURES 1 and 2.

FIGURE 4 is a block diagram of one illustrative embodiment of frequency changer 10 which may be employed in the illustrative system of FIGURES 1 and 2. The frequency changer 10 of FIGURE 4 includes a transformer 51 coupled to the three phase alternating current power line 11, which transformer delivers three-phase output over the output lines 52 to a rectifier 53. The rectifier 53 delivers a direct current output over lines 54 to a filter 55 which eliminates the pulsations on the direct current output and delivers this filtered output over a pair of lines 56 to a direct current-to-alternating current inverter 57. Advantageously, inverter 57 is a fixed voltage inverter which produces a constant alternating current voltage at its output. This constant alternating current voltage output is fed over conductors 58, through a saturable core reactor 59 and the lines 13 to the alternating current inductor motor 12. In this system, the direct current tachometer 16 delivers an output potential from terminal 17 to the combining circuit 18 proportional to the speed of the alternating current motor 12. The operational circuit 18, shown in FIGURE 1, combines a predetermined fixed speed reference potential from the potentiometer 19 with the potential supplied from terminal 17 and delivers a feedback through terminal 23 to the polyphase saturable core reactor 59 to regulate the voltage delivered from the direct current to alternating current inverter 57 to the alternating current motor 12 in a manner well known in the art. The output of combining circuit 20, shown in FIGURE 1, is fed by way of terminal 38 into a firing circuit control frequency reference circuit 60 which is, in fact, a voltage controlled oscillator, with an output frequency proportional to input voltage. The output of firing circuit 60 is fed to an input terminal 61 of the direct current-to-alternating current inverter 57. Preferably, this inverter is of the type employing silicon controlled rectifiers in an arrangement well known in the art and the firing circuit 60 controls the frequency of the output of inverter 57 in accordance with its input voltage.

Figure 5:
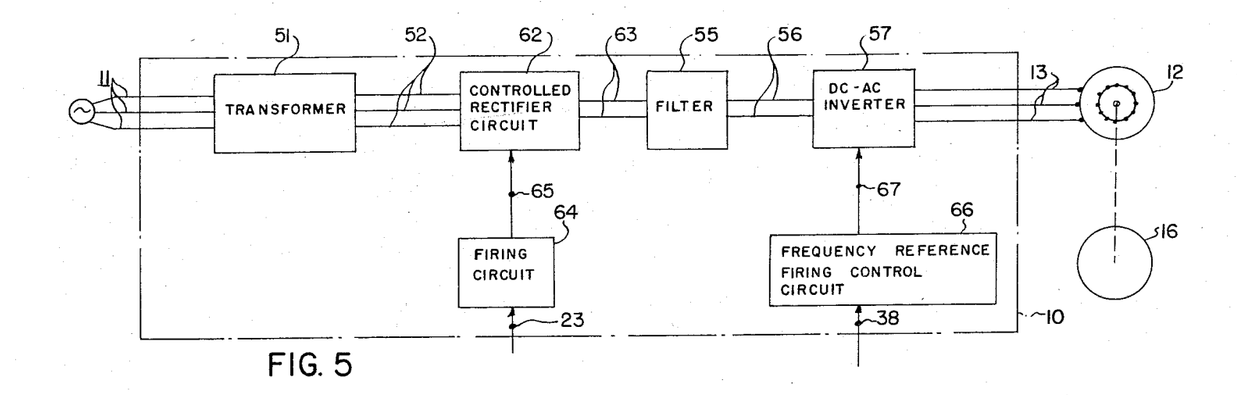
FIGURE 5 is a block diagram of another illustrative embodiment of frequency changer which may be employed in the systems of FIGURES 1 and 2.

FIGURE 5 shows an embodiment of frequency changer 10 somewhat similar to that disclosed in FIGURE 4. In this embodiment, the alternating current power line 11 is connected through the transformer 51 and a transmission line 52 to a controlled rectifier circuit 62. The output of the controlled rectifier circuit 62 is fed through a pair of conductors 63 to the filter 55 and the output of the filter 55 is fed through the lines 56 to the direct current-to-alternating current inverter 57. In this particular embodiment, the output of the inverter 57 is fed over the lines 13 to the alternating current induction motor 12. The controlled rectifier 62 which is preferably, but not necessarily, a silicon controlled rectifier, has its gate electrodes connected to a firing circuit 64 which is controlled in accordance with the input voltage from terminal 23 (FIGURES 1 and 2). Firing circuit 64 is connected to controlled rectifier 62 by a conductor 65 to control the firing of the controlled rectifier circuit 62. The frequency controlling signal from the terminal 38, of FIGURE 1, is fed to a frequency reference firing control circuit 66, the output of which is fed over a conductor 67 to control the output power frequency of the direct current-to-alternating current inverter 57. Thus, in this system, the alternating current output voltage of the inverter 57 is controlled because this output voltage is proportional to the variable direct current input. The reference firing control circuit 66 acts on inverter 57 to regulate the output frequency delivered over the lines 13 to the induction motor 12.

Figure 6:
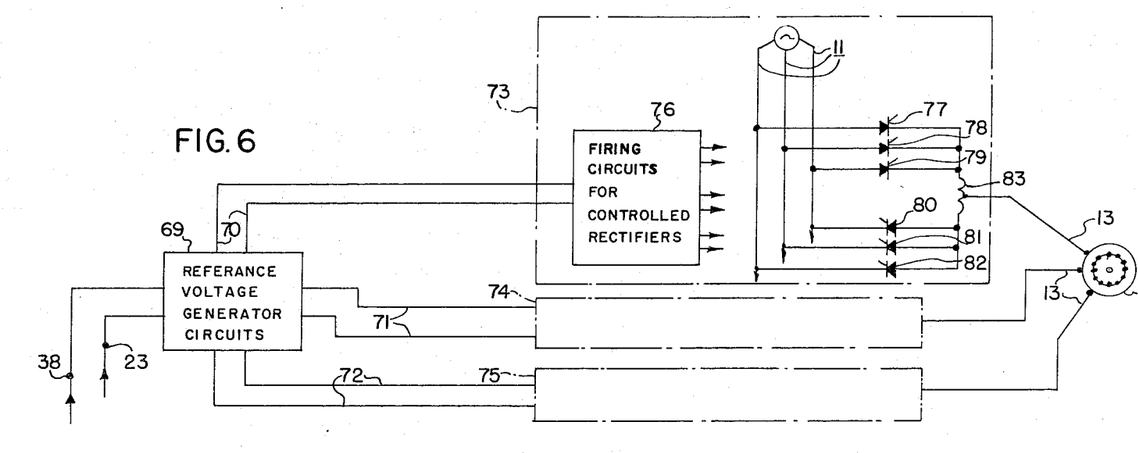
FIGURE 6 is a combined block and schematic diagram of still another illustrative frequency changer which may be employed in the systems of FIGURES 1 and 2.

The application of this slip control system to a cycloconverter variable frequency drive is illustrated in FIGURE 6. The cycloconverter can be logically broken down into two portions, the low power control and reference circuits, and the high power amplifying and synthesizing circuits. The low power circuits include the reference voltage generator circuits indicated by block 69 which will be described in greater detail in conjunction with FIGURE 7. The high power portion of the cycloconverter acts as an amplifier and will produce an output voltage which is a replica of the input voltage supplied to this portion of the converter by the reference voltage generator circuits 69. This particular embodiment of frequency changes will be described in conjunction with the general system for four-quadrant operation, shown in FIGURE 2. The input of the reference voltage generator circuits 69 includes the voltage control error signal from the voltage controlling input terminal 23 and the frequency controlling input signal from the frequency controlling input terminal 38. The output of the reference voltage generator circuits 69 is fed through pairs of lines 70, 71 and 72 to networks which control the delivery of power from the alternating current lines 11 to the alternating current motor 12. These pairs of conductors 70, 71 and 72 are each connected to an identical individual phase circuit 73, 74 and 75, respectively, for the input power. Each of the outputs from the networks 73, 74 and 75 control a single phase output to the alternating current motor 12 over one of the three phase lines 13. Accordingly, only one of these networks, and in particular, the network 73 will be described in detail.

The conductors 70 carry the signal from the reference voltage generator circuits 69 to a group of firing circuits 76 which are each connected in gating relationship to the gate electrode of one of a plurality of silicon controlled rectifiers 77, 78, 79, 80, 81 and 82 in a manner well known in the art. Silicon controlled rectifiers 77 through 82 are connected in oppositely poled phase pairs between each of the lines 11 and a winding 83 of an optional reactor, and the centertap of the winding 83 is connected through one of the lines 13 to the motor 12. The configuration of these firing circuits may be of any convenient type well known in the art. The high power portion of the frequency changer 10 or 73 includes the controlled rectifiers 77 through 82 and the reactor windings, such as the winding 83. The low power portion of the frequency changer 10 or 73 includes the remainder of the frequency changer, such as the reference voltage generator circuit 69, and the firing circuits, such as the circuit 76, for the controlled rectifiers 77 through 82.

The alternating current output frequency of the frequency changer 10 is synthesized from the incoming alternating current power and with a cycloconverter the output frequency must always be lower than the incoming alternating current power frequency. Typical upper output frequency limits are from one-third to one-half of the input frequency.

Figure 7:
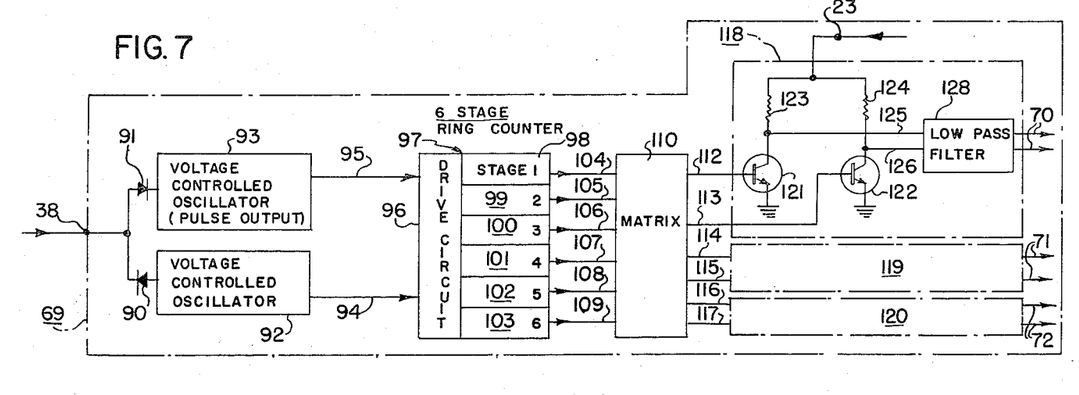
FIGURE 7 is a combined block and schematic diagram of a reference voltage generator which may be employed in the frequency changer shown in FIGURE 6.

FIGURE 7 shows one example of reference voltage generator circuits 69 in which the frequency controlling signal from the input terminal 38 is fed through a pair of oppositely poled diodes 90, 91 to a pair of voltage controlled oscillators 92, 93, respectively. The voltage controlled oscillators 92, 93 respond to positive and negative signals, respectively, and deliver a pulse output in accordance with the voltage of the signal delivered from terminal 38 through the respective diodes 90, 91, in a manner well known in the art. The outputs of the voltage controlled oscillators 92, 93 are fed through individual conductors 94, 95, respectively, to a drive circuit 96. Drive circuit 96 is connected to a six stage ring counter 97 in a manner such that pulses through conductor 94 drive the ring counter 97 in a reverse direction, whereas, pulses fed over the conductor 95 drive the counter 97 in a forward direction.

The six stage ring counter 97 includes stages 98, 99, 100, 101, 102 and 103 and are connected to the output of the drive circuit 96, in a manner well known in the art, such that the drive circuit 96 is capable of driving the six-stage ring counter in either direction depending on which particular conductor, 94 or 95, is pulsed. Each of the six stages of the ring counter is connected through an individual conductor such as the conductors 104, 105, 106, 107, 108 and 109 to a matrix 110. The output of the matrix is delivered over a number of conductors 112, 113, 114, 115 and 116, 117, on a pair basis in a manner which will be subsequently described. These conductors 112 through 117 are connected to a suitable static network including amplifying devices which deliver phase reference signals to the respective firing circuits. Only the circuit 118, connected to the output conductors 112, 113 of the matrix 110, will be described in detail because corresponding circuits 119 and 120 are identical.

Conductor 112 is connected to the base of a transistor 121 and the conductor 113 is connected to the base of a transistor 122. The emitter electrodes of each of these transistors is connected to ground. The collector electrodes of these transistors are connected to the error signal voltage input terminal 23 through resistors 123, 124, respectively, to be amplitude modulated thereby. The collector electrodes of transistors 121, 122 are connected to a low-pass filter 128 through individual conductors 125, 126, respectively. Thus, the filter 128 combines the two signals from matrix conductors 112, 113 which were modulated by the error signal. The output of the low-pass filter 128 is fed through the conductors 70 to control the firing circuits, such as the firing circuits 76 of FIGURE 6, in a manner well known in the art.

Figure 8:
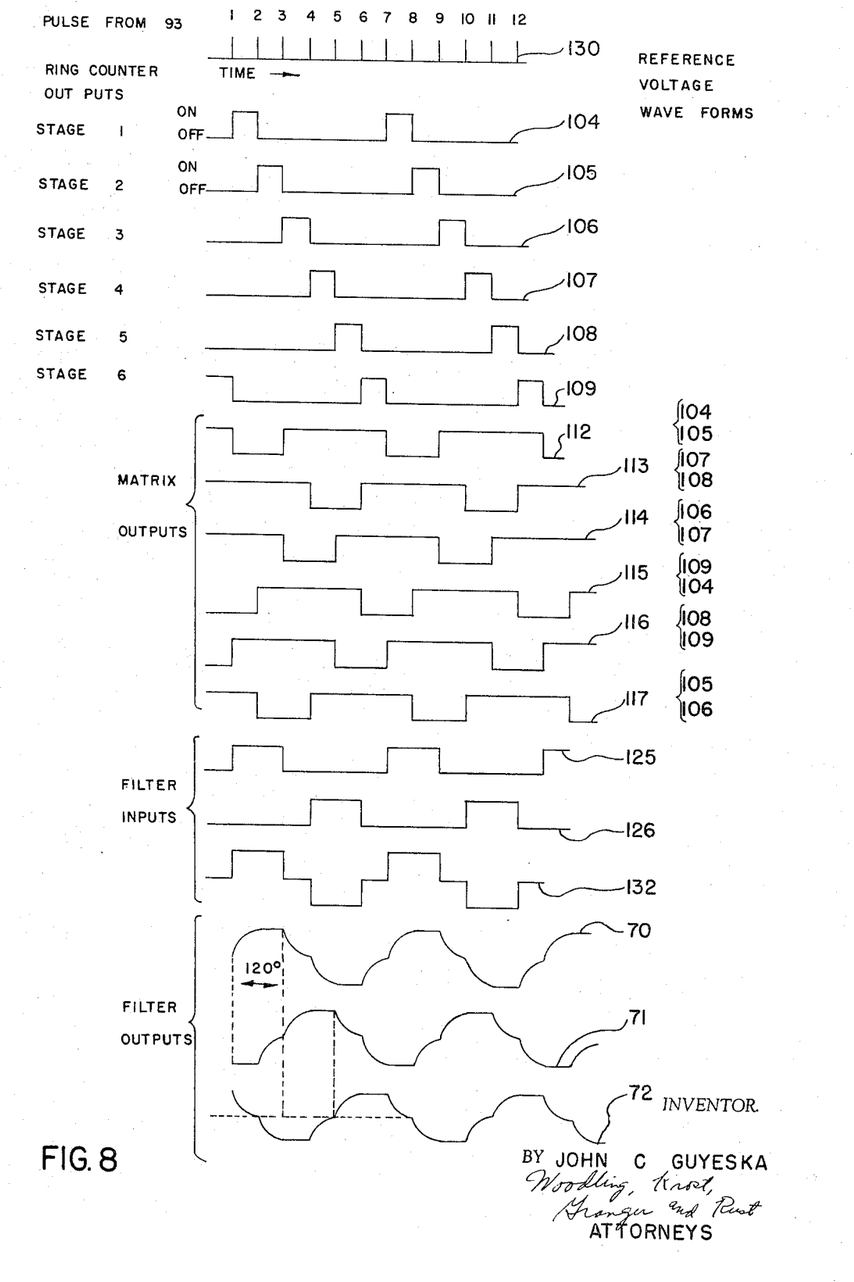
FIGURE 8 is a group of time plots of waveforms which will be employed to describe the operation of this invention.

The operation of the reference voltage generator 69 of FIGURE 7 will now be described in conjunction with the time plots of waveforms illustrated in FIGURE 8. In FIGURE 8, the first time plot is a series of positive pulses 130, which, it is assumed, are being fed from the voltage controlled oscillator 93 over the conductor 95 to drive circuit 96 and the associated ring counter 97 in a forward direction. The output of the ring counter 97 will be fed over the conductors 104 through 109 in a manner corresponding to the pulses designated with the same number as the output conductor in FIGURE 7 over which they are fed. When one of the stages of ring counter 97 is "on" all of the other stages are "off." The time plots designated by the number of the conductors over which they are fed, namely conductors 104 through 109, are plotted in accordance with the actual sequential relationship which will occur if the pulses 130 are continued from the oscillator 93 in a manner indicated on the first line of FIGURE 8.

The outputs of the six stage ring counter 97 are fed through the respective lines 104 through 109 and are combined in the matrix 110 to produce output signals as indicated in the time plots 112 through 117, which time plots are designated with reference numerals which correspond with the conductors in FIGURE 7 over which the signals are fed. The signals fed over the conductor 112 of the matrix correspond with the pulses fed over the conductors 104 and 105 except that the resultant combined pulse is inverted in polarity. Similarly, the signal fed over the conductor 113 is an inverted and combined pulse of the pulses fed over the conductors 107 and 108. The signals fed over the conductor 114 are a combination of the signals fed over the conductors 106 and 107 inverted in polarity. The signals fed over the conductor 115 correspond with the signals fed over the conductors 109 and 104, reversed in polarity. The conductor 116 carries a signal which represents a combination of signals fed over the conductors 108 and 109 inverted in polarity. The conductor 117 carries a signal representing a combination of the pulses fed over the conductors 105 and 106 also inverted in polarity.

Numerous types of matrices can be provided to produce output over a predetermined conductor in accordance with the signals fed from two of a group of six input conductors in a manner well known in the art. The output signals delivered from the transistors 121 and 122 to the conductors 125 and 126 in the presence of a fixed signal from the terminal 54 correspond to the pulse waveforms designated 125 and 126 in FIGURE 8. The signal 125 is a waveform corresponding to that of the input signal or conductor 112 to the base of the transistor 121 except that its polarity is reversed, which polarity reversal takes place in the transistor 121 in a manner well known in the art. Similarly, the pulse waveform 126 at the output of transistor 122 corresponds to the signal applied to the base of transistor 122 over conductor 113 except that it is reversed in polarity. The combination of signals over conductors 125 and 126, as fed to the low-pass filter 128, results in a composite waveform designated 132 in FIGURE 8. The output of the filter 128 is fed over a pair of conductors 70 to the firing circuit 76 and this output corresponds to the waveform designated 70 in FIGURE 8. The outputs of the other portions of the reference voltage generator as fed over the pairs of conductors 71 and 72 correspond to the waveforms designated 71 and 72, respectively, in FIGURE 8. The displacement of 120 electrical degrees between the waveforms 70, 71 and 72 in FIGURE 8 illustrates the time displacement of the operation of firing of the firing circuits 76 and the corresponding circuits in the individual phase circuits 74 and 75 in FIGURE 6. The firing circuits 76 are connected to control rectifiers 77 through 82 such that the controlled rectifiers 77 through 82 fire in a sequentially controlled manner to cause power to be delivered at the proper frequency over lines 13 to motor 12.

From the foregoing explanation, it will be apparent to those skilled in the art that applicant has disclosed a slip frequency control system which optimizes the performance of an induction motor. The first embodiment (FIGURE 1) restricts the slip frequency to a fixed value and thus reduces the requirement of the machine to operate over a wide range of slip frequencies. This is accomplished primarily by algebraically combining a voltage proportional to slip with a voltage proportional to rotor speed and employing the algebraically combined signal to control the frequency of the voltage on the induction motor stator. It will also be apparent that the second embodiment (FIGURE 2) is more versatile than the first embodiment in that it is capable of speed regulation in all four quadrants of the speed-torque curve for the induction motor. This is accomplished by controlling the magnitude of the stator voltage in accordance with the absolute value of a comparison of the rotor speed with a reference value and controlling the frequency of the stator voltage in accordance with the resultant of a comparison of rotor speed and a threshold limited slip signal.

While I have shown and described several illustrative embodiments of this invention, it is understood that the concepts thereof may be applied to other embodiments without departing from the spirit and scope of this invention.

What is claimed is:

1. An induction motor slip frequency control system comprising,
    a plurality of power input terminals adapted to be connected to a source of electrical power,
    frequency changer means coupled to said power input terminals for converting the frequency of the electrical power from said source and having an output frequency controlling input terminal and an output voltage controlling input terminal and a group of output terminals,
    induction motor means including a stator winding coupled to said frequency changer output terminals, and a rotor,
    means delivering a speed signal voltage proportional to the speed of said rotor,
    first static combining means for combining said speed signal voltage with a first speed reference voltage,
    means coupling the output of said first combining means to said voltage controlling input,
    a second source of slip reference voltage, and
    second static combining means having a first input coupled to said source of slip reference voltage, a second input coupled to said speed signal voltage means and an output terminal coupled to said frequency controlling input terminal.

2. The combination according to claim 1 including limiter means coupled between said first and said second static combining means.

3. The combination according to claim 1 wherein said means for coupling said first static combining means to said voltage control input terminal is an absolute value operational amplifier network delivering an output indicative of the magnitude and independent of the polarity of the signal from said second static combining means, said combination further including voltage limiter means coupled between said first and said second static combining means.

4. In an electrical control system for controlling the slip of an induction motor, the combination comprising,
    electrical means for receiving input power of a first frequency and voltage and delivering an output controllable as to frequency and voltage,
    induction motor means coupled to said output and including a rotor,
    generator means coupled to said rotor for delivering an output voltage proportional to the speed of said rotor,
    first static combining means for combining a first reference signal with the voltage proportional to the speed of said rotor, said static combining means being coupled to said electrical means for controlling the output voltage thereof;
    a second source of slip reference voltage, and
    a second static combining means coupled to receive inputs from said generator means and said source of slip reference voltage for delivering an output signal indicative of the algebraic resultant thereof to said electrical means for controlling the output frequency of the voltage from said electrical means to said induction motor whereby said induction motor slip frequency is controlled.

5. The combination according to claim 4 wherein said means for coupling the output of said first static combining means to said electrical means includes an operational amplifier absolute value circuit for delivering an output indicative of the magnitude of the input from said first static combining means and independent of the polarity thereof.

6. The combination according to claim 4 wherein said source of slip reference potential includes voltage limiting means coupling said first static combining means to said second static combining means.

7. In an induction motor slip frequency control system, the combination comprising,
- a frequency changer having an input for primary power, an output frequency controlling input terminal, an output voltage controlling input terminal, and a group of output terminals,
- an induction motor having a stator coupled to said output terminals and a rotor,
- a first source of speed reference voltage,
- first operational amplifier means coupled to said output voltage controlling input terminal for delivering a signal thereto indicative of a comparison of rotor speed with said speed reference voltage,
- a second source of slip signal, and
- second operational amplifier means for delivering a signal to said frequency controlling input terminal proportional to the sum of a rotor speed signal and said slip signal.

8. An induction motor slip frequency control system, comprising,
- a plurality of power input terminals adapted to be connected to a source of electrical power,
- cycloconverter means coupled to said power input terminals for converting the frequency of the electrical power from said source and having an output frequency controlling input terminal and an output voltage controlling input terminal and a group of output terminals,
- induction motor means including a rotor and including a stator coupled to said output terminals of said cycloconverter means,
- generator means coupled to said rotor for delivering an output voltage proportional to the speed of said rotor,
- a source of speed reference voltage,
- first static combining means having two inputs and an output for combining said output voltage proportional to speed with said speed reference voltage,
- means coupling the output of said first combining means to said voltage controlling input terminal,
- a source of slip reference voltage, and
- second static combining means having a first input coupled to said source of slip reference voltage, a second input coupled to said generator means and an output terminal coupled to said frequency controlling input terminal.

9. The combination according to claim 8 including voltage limiter means coupled between the output of said first static combining means and one of the inputs of said second static combining means.

10. The combination according to claim 8 wherein said means for coupling said first static combining means to said voltage control input terminal is an absolute value operational amplifier network delivering an output indicative of the magnitude and independent of the polarity of the signal from said second static combining means, said combination further including voltage limiter means coupled between the output of said first static combining means and one of the inputs of said second static combining means.

11. In an electrical control system for controlling the slip of an induction motor, the combination comprising,
- frequency changer means for receiving input alternating current power of a first frequency and voltage and delivering an output controllable as to frequency and voltage including rectifier means and direct current inverter means, said rectifier means having an output connected to the input of said inverter means,
- induction motor means including a rotor,
- voltage controlling means in said frequency changer means to control the output voltage thereof,
- means connecting the output of said frequency changer means to said motor means,
- means coupled to said rotor for delivering a speed feedback voltage proportional to the speed of said rotor,
- first signal means providing a speed reference,
- first static combining means combining said speed reference signal with said speed feedback voltage, said static combining means being coupled to said voltage controlling means for controlling the output voltage thereof,
- a second voltage source providing a slip reference voltage, and
- second static combining means coupled to receive inputs from said speed feedback voltage and said slip reference voltage for delivering an output signal indicative of the algebraic resultant thereof to said inverter means for controlling the output frequency of the voltage from said inverter means and from said frequency changer means whereby said induction motor slip frequency is controlled.

12. In an electrical control system for controlling the slip of an induction motor, the combination comprising,
- electrical means for receiving input alternating current power of a first frequency and voltage and delivering an output controllable as to frequency and voltage including rectifier means and direct current inverter means, said rectifier means having an output connected to the input of said inverter means,
- induction motor means including a rotor,
- voltage controlling means coupling said inverter to said motor means in driving relationship,
- generator means coupled to said rotor for delivering an output voltage proportional to the speed of said rotor,
- a first source of reference signal,
- first static combining means for combining said reference signal with the voltage proportional to the speed of said rotor, said static combining means being coupled to said voltage controlling means for controlling the output voltage thereof,
- a second source of slip reference voltage, and
- second static combining means coupled to receive inputs from said generator means and said source of slip reference voltage for delivering an output signal indicative of the algebraic resultant thereof to said inverter means for controlling the output frequency of the voltage from said inverter means to said voltage controlling means whereby said induction motor slip frequency is controlled.

13. The combination according to claim 12 including an operational amplifier absolute value circuit coupling the output of said first static combining means to said voltage controlling means for delivering an output indicative of the magnitude of the input from said first static combining means and independent of the polarity thereof.

14. The combination according to claim 12 wherein said source of slip reference voltage includes voltage limiting means coupling the output of said first static combining means to one of the inputs of said second static combining means.

15. In an induction motor slip frequency control system, the combination comprising,
- a frequency changer having a group of primary power input terminals, an output frequency controlling input terminal, an output voltage controlling input terminal and a group of output terminals, said changer including a controlled rectifier and a direct current-to-alternating current inverter connected in that order between said primary input terminals and said group of output terminals and further including output voltage control means coupled between said output voltage controlling input terminal and said controlled rectifier to control same and frequency control means coupled between said frequency controlling input terminal and said inverter to control same, an induction motor having a stator coupled to said output terminals and including a rotor,
a first source of speed reference voltage,
first operational amplifier means coupled to said output voltage controlling input terminal for delivering a signal thereto indicative of a comparison of rotor speed with said speed reference voltage,
a second source of slip reference voltage, and
second operational amplifier means for delivering a signal to said frequency controlling input terminal indicative of a summation of a signal proportional to the speed of said rotor with a signal proportional to said slip reference voltage.

16. The combination according to claim 15 wherein said second operational amplifier means includes voltage limiter means coupled to the output of said first operational amplifier means.

17. The combination according to claim 16 further including an operational amplifier absolute value circuit coupled between said second operational amplifier means and said frequency controlling input terminal.

18. The combination according to claim 2, wherein said limiter means is coupled to said first input of said second static combining means to serve as said source of slip reference voltage and to maintain the slip of said induction motor directly in accordance with the magnitude of said slip reference voltage.

19. The combination according to claim 1, including limiter means to limit the maximum amplitude of said slip reference voltage.

References Cited
UNITED STATES PATENTS

| | | | |
|---|---|---|---|
| 2,784,365 | 3/1957 | Fenemore et al. | 318—230 |
| 2,876,406 | 3/1959 | Charbonneaux et al. | 318—227 |
| 3,105,180 | 9/1963 | Burnett | 318—138 |
| 3,127,547 | 3/1964 | Biringer et al. | 318—231 X |
| 3,129,368 | 4/1964 | Burnett | 318—227 |
| 3,165,686 | 1/1965 | MacDonald | 318—231 X |

FOREIGN PATENTS 745,840  3/1956  Great Britain.

OTHER REFERENCES

Millman and Taub, Pulse and Digital Circuits, 1956, pp. 22–26.

ORIS L. RADER, *Primary Examiner.*

G. RUBINSON, *Assistant Examiner.*